United States Patent [19] [11] 4,412,761
Sorensen et al. [45] Nov. 1, 1983

[54] SELF-REGULATING AIR INLET

[75] Inventors: Robert Sorensen, Glen Ellyn; Edward A. Barrett, Glendale Heights; Thomas J. Scarnato, Barrington, all of Ill.

[73] Assignee: International Harvester Co., Chicago, Ill.

[21] Appl. No.: 299,903

[22] Filed: Sep. 8, 1981

[51] Int. Cl.³ .............................................. B65G 53/58
[52] U.S. Cl. ....................................................... 406/98
[58] Field of Search ....................... 406/42, 57, 58, 71, 406/80, 107, 97–104, 193; 415/148, 151, 155, 183

[56] References Cited

U.S. PATENT DOCUMENTS

| | | | |
|---|---|---|---|
| 2,180,379 | 11/1939 | Whitfield | 406/98 |
| 2,239,913 | 4/1941 | Hall | 406/98 |
| 3,466,095 | 9/1969 | Weihmuller | 406/57 |
| 3,724,908 | 4/1973 | Burrough et al. | 406/71 |

Primary Examiner—Jeffrey V. Nase
Attorney, Agent, or Firm—Boris Parad; F. David AuBuchon

[57] ABSTRACT

In a centrifugal blower used for conveyance of certain materials, a self-regulating air inlet assembly which automatically adjusts the amount of secondary air flow according to the needs of the blower, thereby supplementing the principal air flow and stabilizing the air flow in the discharge duct.

10 Claims, 3 Drawing Figures

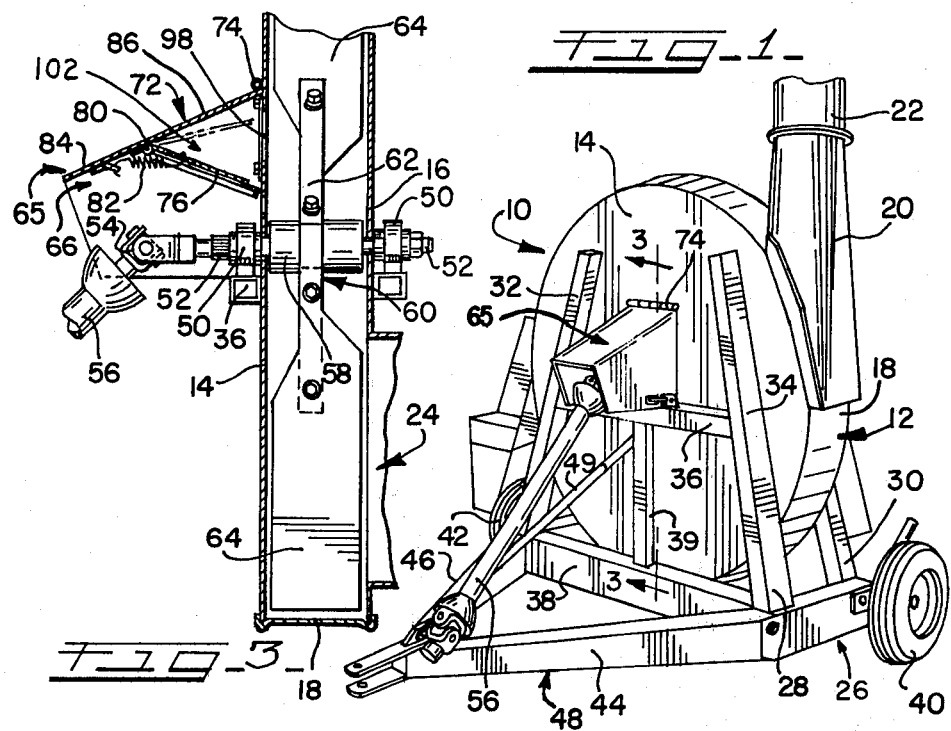
FIG-1
FIG-3
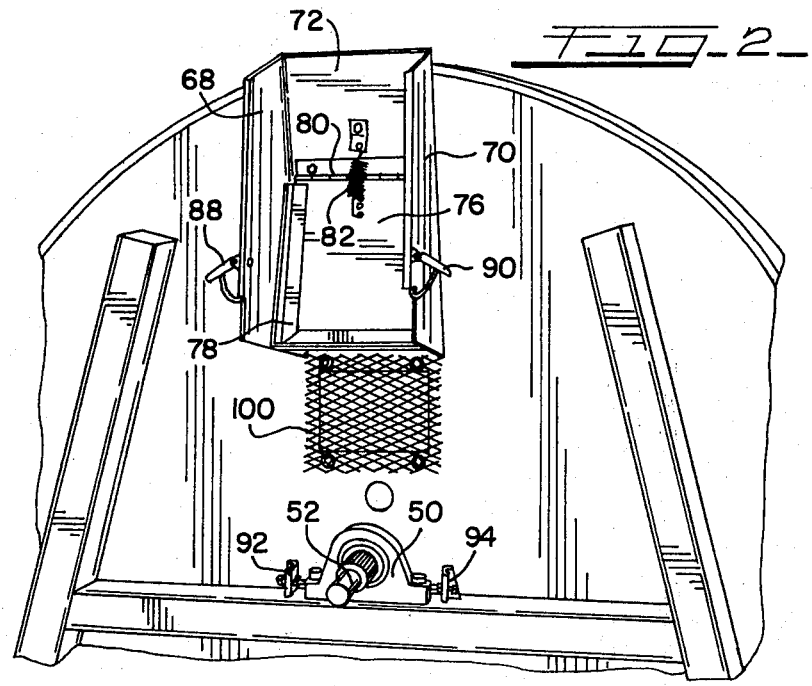
FIG-2

SELF-REGULATING AIR INLET

BACKGROUND OF THE INVENTION

1. Field of the Invention

This invention relates to feed material handling apparatuses such as blowers and more particularly to air inlets therefor.

2. Description of the Prior Art

The prior art discloses various material handling apparatuses such as blowers for pneumatic conveyance of material, such as silage, grain and the like, into silos, storage bins, etc. Air inlets are often provided in the blower side sheets with either of a fixed hole size or manually adjusted by means of a sliding cover. For example, the U.S. Pat. No. 3,724,908 discloses a feed material handling apparatus which has a screen air inlet mounted on its side sheet.

Another U.S. Pat. No. 3,466,095 discloses a blower type material feeder having its sidewall perforated with a plurality of small air holes to supply a little excess air to aid in the pneumatic conveyance of the material around the housing. The air passing through the holes helps to prevent material build-up on the forward sidewall and reduces the running friction on the rotor assembly caused by material lodged between the edges of the rotor blades and the inside surface of the sidewall.

However, none of the prior art references of record discloses the novel self-regulating air inlet assembly as specified and described in the subject invention.

SUMMARY OF THE INVENTION

According to the invention, a self-regulating air inlet assembly is provided in a material handling apparatus for conveyance of the material. The apparatus has a housing with a material feed inlet, discharge conduit and a rotor conveying material from the feed inlet into the discharge conduit. The air conducting means are connected with the apparatus for facilitating the entry of the secondary air flow supplementing principal air flow entering the apparatus through the material feed inlet. The air conducting means have a movable door displaceable by the pressure differential between the housing outside and inside pressures created by the reduction of the air pressure inside of said housing. The secondary air flow automatically compensates a continuously varying air need caused by intermittent material feeding, thereby facilitating smooth and steady flow.

BRIEF DESCRIPTION OF THE DRAWINGS

FIG. 1 is an illustrative perspective view of the centrifugal blower;

FIG. 2 is a blown up side view of the air inlet assembly shown in the raised, non-operational position; and FIG. 3 is a cross-sectional view taken substantially along the line 3—3 of FIG. 1.

DESCRIPTION OF THE PREFERRED EMBODIMENT

Referring now to the drawings wherein reference characters designate like or corresponding parts throughout the several views, there is shown in FIG. 1 a centrifugal blower 10 for pneumatically conveying material, such as forage, silage, grain, and the like, into silos, storage bins, etc. The blower housing 12 comprises a pair of axially spaced side walls or sheets 14 and 16, a peripheral wall or rim sheet 18 which is provided with a discharge conduit 20 extended substantially tangentially with respect to the peripheral wall 18 and communicating with an upwardly directed silo duct or piping 22 attached thereto. A material feed inlet 24 is communicating with the sidewall 16. The blower housing 12 is connected to a framework venerally designated 26 which includes front and rear frame sidings 28, 30 embracing the housing 12 therebetween and integrated with the respective sidewalls 14 and 16.

The frame 28 being of a generally H-shape comprises a pair of laterally spaced and inclined toward each other members 32, 34 which at their middle portion are connected by a substantially horizontal axle beam 36 and the lower ends thereof are connected by a substantially horizontal brace 38. The framework 26 is mounted on the support wheels 40, 42. The frame structures 28, 30 are hingedly connected to the forwardly converging side beam members 44, 46 of the A-shaped draft frame 48 and supported by a diagonal brace 49.

As shown in FIGS. 2 and 3, the axle beams 36 support bearing assemblies 50, adjacent to the sidewalls 14 and 16, which in turn support a drive shaft 52 which is suitably connected through a universal joint 54 to a power shaft 56. It will be understood that the input of power to the blower conveyor unit may be from any source.

The drive shaft 52 projecting outwardly of the blower housing 12 is connected to the hub 58 of a central rotatable impeller or rotor generally designated 60 which has a plurality of radial arms 62. Each of the arms 62 carries a paddle 64 at its outer extremity. The rotor 60 imparts impetus to the material, thereby conveying it from the feed inlet 24 to the discharge conduit 20.

A self-regulating air inlet assembly 65 comprises an air duct 66 of a generally inverted U-shape which includes sideplates 68, 70 integrally connected by a top wall 72. The duct 66 is pivotally attached to the blower sidewall 14 by a hinge 74 for positioning of the duct 66 in operational (as shown in FIG. 3) or non-operational raised mode, as best shown in FIG. 2. The door 76 is supported by a generally U-shaped flange frame 78 rigidly attached to the sideplates 68, 70. The door 76 is also pivotally connected to the top wall 72 by a hinge 80. A pull-off or tension spring 82 is connected to the door 76 and the top wall 72 and urging the door 76 to close the duct 66. The top wall 72 slopes downwardly and outwardly from the sidewall 14, as shown in FIG. 3, and is divided by a hinge 80 into outer portion 84 and inner portion 86. The top wall 72 together with the sideplates 68 and 70 form a protective shield covering the drive shaft 52 thereby protecting it from outside precipitation and accidental falling of any objects or material. A latch 88 is attached to the sideplates 68 and a latch 90 to the sidewall 70. Latches 88 and 90 lockingly engage keepers 92, 94, respectively, which are rigidly mounted on the axle beam 36, thereby securely holding the air duct 66 in the operational position.

An opening 98 in the sidewall 14 covered by a screen 100 facilitates communication of the secondary air flow between the blower housing 12 and a chamber 102. The chamber 102 is formed by the top wall inner portion 86, sideplates 68, 70 and the door 76.

In operation, a forage blower conveys a large volume of air along with the material that is being blown up into the silo duct. The principal flow of air enters the blower with the material through the side sheet material feed inlet. The amount of air that can enter the blower at the feed material inlet will vary somewhat inversely with the material feed rate. During high feed rates the inlet may be mostly used for inflowing material which will leave very little area for inflowing air. The forage wagons which are used to feed material into the forage blower usually unload at very uneven feed rates. Therefore, the need for air at the secondary inlet is continuously varying. The amount of air needed at the secondary air inlet is only that amount required to supplement the principal air flow through the material inlet. If the air inlet is too large, and objectionable air turbulance will be created at the material inlet and the suction which helps move material into the blower will be greatly reduced. If the secondary air inlet is too small the conveying velocity in the silo pipe can be reduced due to the inadequate air flow. This would cause the silo pipe plugging, especially on tall silos. The subject invention is a secondary air inlet which will automatically vary the amount of supplementary air flow through the blower according to the needs of the blower.

When the pressure within the blower housing 12 is reduced at the time the feeding material enters the blower 10 and the pressure differential between the door 76 inside pressure and outside atmospheric pressure is great enough to overcome the force of the spring 82, the door 76 will be pushed inwardly and upwardly into the chamber 102. This would allow the secondary air flow to enter into the blower 10 through the opening 98. The greater the pressure differential between the door 76 outside pressure and the chamber 102 inside pressure, the wider will be the opening by the door 76. Therefore, the blower need for additional supplementary air will be automatically compensated by the air flow entering through the air inlet with a variable width door opening. This will facilitate smooth and steady air flow through the blower housing and into the silo pipe and alleviate above mentioned problems of excessive friction or plugging and turbulance.

The foregoing description and drawings merely illustrate the invention and the invention is not limited thereto, except insofar as the appended claims are so limited, and so those skilled in the art who have the disclosure before them will be able to make modifications and variations therein without departing from the scope of the invention.

What is claimed is:

1. A self-regulating air inlet assembly in a material handling apparatus for conveyance of the material comprising:
    said apparatus having a housing with a material feed inlet, discharge conduit and a rotatable central member conveying the material from said feed inlet into said discharge conduit;
    an air conducting means connected with said apparatus;
    said air conducting means facilitating the entry of a secondary air flow supplementing principal air flow entering said apparatus through said material feed inlet;
    said air conducting means having a movable door displaceable by pressure differential between the housing outside and inside pressures created by the reduction of the air pressure inside of said housing; and
    said secondary air flow automatically compensating a continuously varying air need caused by intermittent material feeding affecting supply of said principal air flow.

2. The assembly according to claim 1, and said air conducting means comprising biasing means attached to said door for urging thereof to block said secondary air flow.

3. The assembly according to claim 1, and said air conducting means comprising:
    an opening in said material handling apparatus; and
    said opening and said material feed inlet being disosed on opposite sides of said blower.

4. The assembly according to claim 1, and said air conducting mans including a protective shield covering a drive shaft of said central member and pivotally connected with said apparatus.

5. The assembly according to claim 1, and said apparatus being a blower of a generally circular shape with said material feed inlet disposed on one side and said air conducting means on the other side thereof, said air conducting means pivotally mounted on and lockingly engageable with said apparatus.

6. A self-regulating air inlet assembly mounted on a blower conveying certain material, said blower having a generally circular shape and comprising a discharge condiut, a rotor located within said blower for imparting impetus to the material, a material feed inlet through which a principal air flow is entered, said rotor having a drive shaft projecting outwardly of said blower, and said air inlet assembly further comprising:
    air duct means movably attached to said blower for delivering a secondary air flow thereinto;
    said duct means having a door movably attached thereto;
    said blower having an opening for said secondary air flow, so that pressure differential between blower outside and inside pressure will open said door to the extent proportional to said pressure differential and permit the outside air to enter said blower housing through said opening.

7. The assembly according to claim 6, and said duct means comprising a chamber communicating with said door and said opening.

8. The assembly according to claim 6, and biasing means attached to said duct means, and said door hinged to said duct means with its free end being connected to said biasing means urging said door to close said duct means.

9. The assembly according to claim 6, and said duct means having one end hingedly attached to said blower and another end pivotally movable; and
    latch means lockingly attaching said another end to said blower.

10. The assembly according to claim 6, and said duct means comprising a protective shield covering said drive shaft, and said shield having a generally inverted U-shape configuration.

* * * * *